(12) United States Patent
Song et al.

(10) Patent No.: US 12,175,208 B2
(45) Date of Patent: Dec. 24, 2024

(54) ARITHMETIC APPARATUS, OPERATING METHOD THEREOF, AND NEURAL NETWORK PROCESSOR

(71) Applicant: SAMSUNG ELECTRONICS CO., LTD., Suwon-si (KR)

(72) Inventors: Jinook Song, Seongnam-si (KR); Daekyeung Kim, Suwon-si (KR); Junseok Park, Hwaseong-si (KR); Joonho Song, Hwaseong-si (KR); Sehwan Lee, Suwon-si (KR); Junwoo Jang, Suwon-si (KR); Yunkyo Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1150 days.

(21) Appl. No.: 16/989,391

(22) Filed: Aug. 10, 2020

(65) Prior Publication Data
US 2021/0174179 A1    Jun. 10, 2021

(30) Foreign Application Priority Data
Dec. 6, 2019    (KR) .................. 10-2019-0161679

(51) Int. Cl.
G06F 7/544    (2006.01)
G06N 3/063    (2023.01)

(52) U.S. Cl.
CPC .......... *G06F 7/5443* (2013.01); *G06N 3/063* (2013.01); *G06F 2207/382* (2013.01)

(58) Field of Classification Search
CPC .. G06F 7/5443; G06F 2207/382; G06F 7/485; G06F 7/523; G06F 2117/04;
(Continued)

(56) References Cited

U.S. PATENT DOCUMENTS 6,745,336 B1 *  6/2004  Martonosi .............. G06F 1/3203
                                                          713/340
9,779,355 B1    10/2017  Leobandung
(Continued)

FOREIGN PATENT DOCUMENTS

KR    10-2017-0080087 A    7/2017
KR    10-2019-0066473 A    6/2019

OTHER PUBLICATIONS

Lecture 21, Power Oprimization (Part 2), Xuan 'Silvia' Zhang, Washington University in St. Louis, https://classes.engineering.wustl.edu/ese461/Lecture/week12b.pdf, Slides 7-14 (Year: 2016).*
(Continued)

*Primary Examiner* — Emily E Larocque
(74) *Attorney, Agent, or Firm* — Sughrue Mion, PLLC

(57) ABSTRACT

An arithmetic apparatus includes a first operand holding circuit configured to output a first operand according to a clock signal, generate an indicator signal based on bit values of high-order bit data including a most significant bit of the first operand, and gate the clock signal based on the indicator signal, the clock signal being applied to a flip-flop latching the high-order bit data of the first operand; a second operand holding circuit configured to output a second operand according to the clock signal; and an arithmetic circuit configured to perform data gating on the high-order bit data of the first operand based on the indicator signal and output an operation result by performing an operation using a modified first operand resulting from the data gating and the second operand.

18 Claims, 17 Drawing Sheets

(58) Field of Classification Search
CPC . G06F 1/3237; G06F 1/32; G06F 7/44; G06F 1/04; G06F 17/15; G06F 17/153; G06F 17/16; G06F 7/483; G06F 7/4876; G06F 7/52; G06F 7/544; G06N 3/063; G06N 3/0464; G06N 3/0442
See application file for complete search history.

(56) References Cited

U.S. PATENT DOCUMENTS

| | | |
|---|---|---|
| 2017/0300815 A1 | 10/2017 | Seo |
| 2018/0300615 A1 | 10/2018 | Ambardekar et al. |
| 2019/0041961 A1 | 2/2019 | Desai et al. |
| 2019/0065896 A1 | 2/2019 | Lee et al. |
| 2019/0171930 A1* | 6/2019 | Lee .................. G06N 3/04 |
| 2019/0227807 A1 | 7/2019 | Martin et al. |

OTHER PUBLICATIONS

The PowerPC 600 Series, part 5: Rotates and shifts, Raymond Chen, https://devblogs.microsoft.com/oldnewthing/20180810-00/?p=99465 (Year: 2018).*

In More Depth, The Power PC's Multiply-Add Instruction, https://course.ccs.neu.edu/cs3650/ssl/TEXT-CD/Content/COD3e/InMoreDepth/IMD3-The-PowerPCs-Multiply-Add-Instruction.pdf, IMD 3.11-6 (Year: 2007).*

D. Brooks, et al., Value-Based Clock Gating and Operation Packing: Dynamic Strategies for Improving Processor Power and Performance, ACM Transactions on Computer Systems, vol. 18, No. 2, 2000 (Year: 2000).*

Eunhyeok Park et al., "Energy-efficient Neural Network Accelerator Based on Outlier-aware Low-precision Computation", DOI 10.1109/ISCA.2018.00063, ACM/IEEE 45th Annual International Symposium on Computer Architecture, IEEE Computer Society, 2018, pp. 688-698, 11 pages total.

Dongyoung Kim et al., "A Novel Zero Weight/Activation-Aware Hardware Architecture of Convolutional Neural Network", Design, Automation & Test in Europe Conference & Exhibition, 2017, pp. 1462-1467, 6 pages total.

Communication issued on Jul. 4, 2024 by the Korean Intellectual Property Office for Korean Patent Application No. 10-2019-0161679.

* cited by examiner

ARITHMETIC APPARATUS, OPERATING METHOD THEREOF, AND NEURAL NETWORK PROCESSOR

CROSS-REFERENCE TO RELATED APPLICATION

This application claims the benefit of Korean Patent Application No. 10-2019-0161679, filed on Dec. 6, 2019, in the Korean Intellectual Property Office, the disclosure of which is incorporated by reference herein in its entirety.

BACKGROUND

1. Field

The application relates to an arithmetic apparatus, an operating method thereof, and a neural network processor. More particularly, embodiments of the application relate to an arithmetic circuit performing an operation, such as a convolution operation, using operands, an operating method thereof, and a neural network processor performing the same.

2. Description of Related Art

A neural network refers to a computational architecture modeled after a biological brain. As neural network technology has recently developed, research has increasingly analyzed using a neural network device, which implements one neural network model, in various kinds of electronic systems.

A neural network device needs to perform a large amount of computations on complex input data, which requires significant power consumption. Therefore, a technique for allowing an arithmetic apparatus, like a neural network device, to efficiently and quickly perform computations with reduced power consumption when analyzing input data in real time and extracting information is desirable.

SUMMARY

Embodiments of the application relate to a method for reducing power consumption of operations of an arithmetic apparatus using operands.

According to an aspect of an embodiment, there is provided an arithmetic apparatus including a first operand holding circuit configured to generate an indicator signal based on bit values of high-order bit data of a first operand input to the first operand holding circuit, the high-order bit data of the first operand including a most significant bit of the first operand, gate a clock signal input to the first operand holding circuit based on the indicator signal, to generate a gated clock signal, generate latched high-order bit data of the first operand based on the gated clock signal being applied to a flip-flop latching the high-order bit data of the first operand, and output bit data of the first operand, the bit data of the first operand comprising the latched high-order bit data of the first operand and low-order bit data of the first operand; a second operand holding circuit configured to output a second operand input to the second operand holding circuit based on the clock signal; and an arithmetic circuit configured to perform data gating on the latched high-order bit data of the first operand based on the indicator signal, to generate data-gated high-order bit data of the first operand and output an operation result by performing an operation using a modified first operand comprising the data-gated high-order bit data of the first operand and the low-order bit data of the first operand and the second operand.

According to another aspect of an embodiment, there is provided an arithmetic apparatus including a first operand holding circuit configured to output a first operand holding circuit configured to output a modified first operand based on a clock signal, the first modified first operand comprising high-order bit data of a first operand input to the first operand holding circuit and low-order bit data of the first operand; a second operand holding circuit configured to output a second operand input to the second holding circuit based on the clock signal; and an arithmetic circuit configured to output an operation result by performing an operation using the modified first operand and the second operand, wherein the arithmetic circuit includes a first clock gating circuit configured to generate a first gated clock signal by selectively passing the clock signal based on values of the high-order bit data of the first operand; a first flip-flop configured to latch the high-order bit data of the first operand based on the first gated clock signal; and a second flip-flop configured to latch the low-order bit data of the first operand based on the clock signal.

According to an aspect of an embodiment, there is provided a neural network processor for accelerating a neural network. The neural network processor includes an input feature holding circuit configured to output an input feature value based on a clock signal, to generate an indicator signal based on input feature high-order bit data corresponding to high-order bit values of a predetermined number of bits in the input feature value, and to gate the clock signal according to a logic level of the indicator signal, the clock signal being applied to a first flip-flop latching the input feature high-order bit data; a weight holding circuit configured to output a weight value according to the clock signal; and an arithmetic circuit configured to perform data gating on the input feature high-order bit data according to a logic level of the indicator signal and output an operation result by performing multiplication and accumulation using a modified input feature value resulting from the data gating and the weight value.

According to an aspect of an embodiment, there is provided a neural network processor for accelerating a neural network. The neural network processor includes a weight holding circuit configured to output a weight value based on a clock signal, generate an indicator signal based on weighted high-order bit data corresponding to high-order bit values of a predetermined number of bits in the weight value, and gate the clock signal according to a logic level of the indicator signal, the clock signal being applied to a first flip-flop latching the weighted high-order bit data; an input feature holding circuit configured to output an input feature value based on the clock signal; and an arithmetic circuit configured to perform data gating on the weight high-order bit data based on the logic level of the indicator signal and output an operation result by performing multiplication and accumulation using a modified weighted value resulting from the data gating and the input feature value.

According to an aspect of an embodiment, there is provided an operating method of an arithmetic apparatus. The operating method includes generating an indicator signal based on bit values of high-order bit data of a first operand; gating a clock signal based on a logic level of the indicator signal, the clock signal being applied to a flip-flop corresponding to the high-order bit data of the first operand; performing data gating on the high-order bit data of the first operand based on the logic level of the indicator signal; and outputting an operation result by performing an operation using a modified first operand resulting from the data gating and a second operand.

BRIEF DESCRIPTION OF THE DRAWINGS

Embodiments of the application will be more clearly understood from the following detailed description taken in conjunction with the accompanying drawings in which.

DETAILED DESCRIPTION OF THE EMBODIMENTS

Hereinafter, embodiments will be described in detail with reference to the attached drawings.

Figure 1:
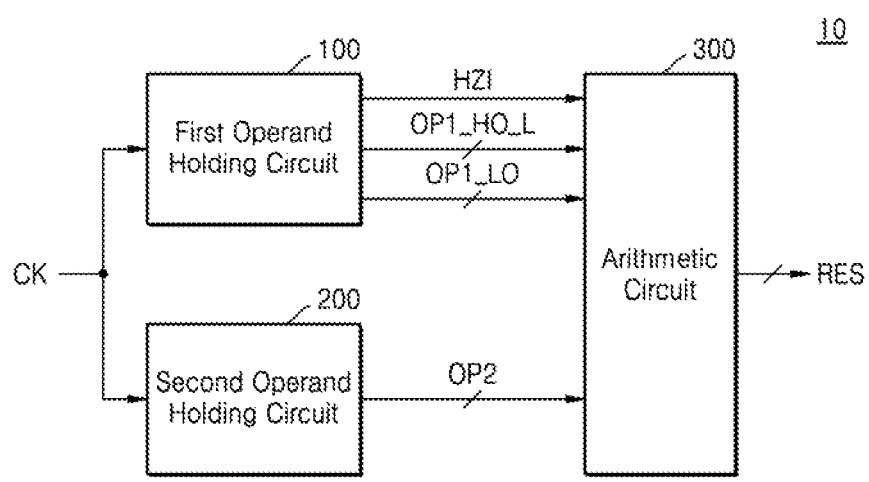
FIG. 1 illustrates an arithmetic apparatus according to an embodiment.

FIG. 1 illustrates an arithmetic apparatus 10 according to an embodiment. The arithmetic apparatus 10 may be implemented in any device that performs a computational operation using an operand. The operation may include at least one of various operations. For example, the operation may include a mathematical operation such as multiplication, addition, or convolution, at least one logical operation, or a combination of a mathematical operation and a logical operation. In an embodiment, the arithmetic apparatus 10 may be applied to a neural network processor that performs convolution.

The arithmetic apparatus 10 may include a first operand holding circuit 100, a second operand holding circuit 200, and an arithmetic circuit 300.

The first operand holding circuit 100 may store a first operand and may output the first operand according to a clock signal CK. For example, the first operand holding circuit 100 may output the first operand at a rising edge and/or a falling edge of the clock signal CK. In other words, the first operand holding circuit 100 may output the first operand synchronized with a rising edge and/or a falling edge of the clock signal CK.

The first operand may include first high-order bit data OP1_HO and first low-order bit data OP1_LO. For example, the first high-order bit data OP1_HO may include a predetermined number of high-order bit values of the first operand expressed as a binary number, and the first low-order bit data OP1_LO may include the other bit values of the first operand, excluding the first high-order bit data OP1_HO. As a non-limiting example for convenience of description, the first operand may be 8-bit data, the first high-order bit data OP1_HO may be high-order 4-bit data of the first operand, and the first low-order bit data OP1_LO may be low-order 4-bit data.

In an embodiment, the first operand holding circuit 100 may generate an indicator signal HZI based on the bit values of the first high-order bit data OP1_HO and may provide the indicator signal HZI to the arithmetic circuit 300. The indicator signal HZI may indicate whether all bit values of the first high-order bit data are "0." For example, when all bit values of the first high-order bit data are "0," the indicator signal HZI may have a first logic level (e.g., "0"), and when at least one of the bit values of the first high-order bit data is not "0," the indicator signal HZI may have a second logic level (e.g., "1"), which is different from the first logic level. In other words, the first operand holding circuit 100 may monitor the high-order bit values of the first operand to output the indicator signal HZI.

In an embodiment, the first operand holding circuit 100 may include a first flip-flop, which latches the first high-order bit data OP1_HO, and a second flip-flop, which latches the first low-order bit data OP1_LO. The first operand holding circuit 100 may perform clock gating on the clock signal CK, which is applied to the first flip-flop, according to the logic level of the indicator signal HZI. In other words, the first operand holding circuit 100 may generate a gated clock signal by selectively passing the clock signal CK based on the logic level of the indicator signal HZI and may provide the gated clock signal to the first flip-flop. The first flip-flop may latch the first high-order bit data OP1_HO according to the gated clock signal and output latched first high-order bit data OP1_HO_L. The first operand holding circuit 100 may provide the latched first high-order bit data OP1_HO_L, the indicator signal HZI, and the first low-order bit data OP1_LO to the arithmetic circuit 300.

The second operand holding circuit 200 may store a second operand OP2 and may output the second operand OP2 according to the clock signal CK. For example, the second operand holding circuit 200 may output the second operand OP2 at a rising edge and/or a falling edge of the clock signal CK. In other words, the second operand holding circuit 200 may output the second operand OP2 synchronized with the rising edge and/or the falling edge of the clock signal CK.

The arithmetic circuit 300 may perform an operation taking the first operand and the second operand OP2 as input values, and output an operation result RES.

In an embodiment, the arithmetic circuit 300 may perform data gating on the latched first high-order bit data OP1_HO_L according to the logic level of the indicator signal HZI. For example, the arithmetic circuit 300 may selectively pass the latched first high-order bit data OP1_HO_L based on the logic level of the indicator signal HZI to be used in an operation. To implement such functionality, the arithmetic circuit 300 may include a data gating circuit, which will be described in detail with reference to FIG. 3.

In an embodiment, the arithmetic circuit 300 may include a third flip-flop, which latches the latched first high-order bit data OP1_HO_L, and a fourth flip-flop, which latches the first low-order bit data OP1_LO. The arithmetic circuit 300 may also perform clock gating on the clock signal CK, which is applied to the third flip-flop, according to the logic level of the indicator signal HZI. In other words, the arithmetic circuit 300 may generate a gated clock signal by selectively passing the clock signal CK based on the logic level of the indicator signal HZI and may provide the gated clock signal to the third flip-flop. The third flip-flop may latch the latched first high-order bit data OP1_HO_L according to the gated clock signal.

The arithmetic circuit 300 may perform an operation using the second operand OP2 and a modified first operand, which results from at least one selected from the clock gating of the first operand holding circuit 100, the clock gating of the arithmetic circuit 300, and the data gating of the arithmetic circuit 300. The arithmetic circuit 300 may output the operation result RES. In an embodiment, the operation may include convolution, and more specifically multiplication and accumulation. In an embodiment, the arithmetic circuit 300 may include a calculation circuit including a multiplication circuit and an accumulation circuit. The arithmetic circuit 300 will be described in detail with reference to FIGS. 3, 4, 7, 8A and 8B.

According to an embodiment, the arithmetic apparatus 10 may perform clock gating on a clock signal, which is applied to a flip-flop related to first high-order bit data of a first operand. For example, when all bit values of the first high-order bit data are "0," the arithmetic apparatus 10 may perform clock gating such that the clock signal is not applied to the flip-flop that latches the first high-order bit data, thereby eliminating unnecessary transition of a signal in a signal line that transmits the first high-order bit data. As the amount of unnecessary signal transitions decreases, the power consumption of the arithmetic apparatus 10 may be decreased.

In addition, the arithmetic apparatus 10 may perform data gating on the first high-order bit data of the first operand. For example, when the bit values of the first high-order bit data are all "0," the arithmetic apparatus 10 may perform data gating such that the first high-order bit data is not transmitted to a calculation circuit, thereby eliminating unnecessary transition of a signal in a signal line that transmits the first high-order bit data. As the amount of unnecessary signal transitions decreases, the power consumption of the arithmetic apparatus 10 may be decreased.

Figure 2:
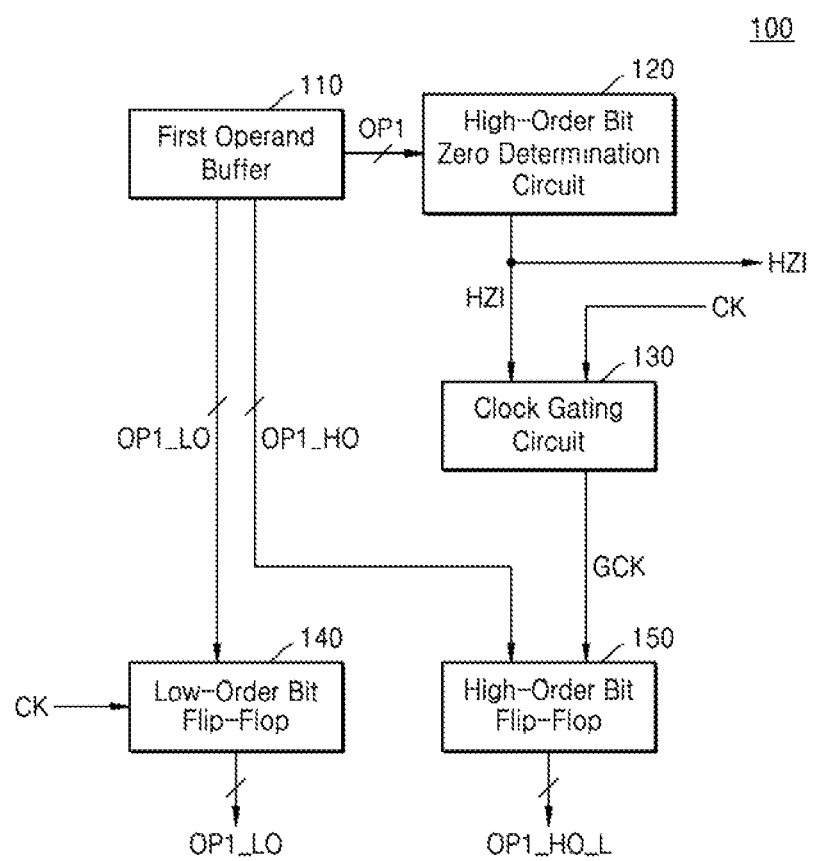
FIG. 2 illustrates a first operand holding circuit according to an embodiment.

FIG. 2 illustrates the first operand holding circuit 100 according to an embodiment. FIG. 2 will be described with reference to FIG. 1.

The first operand holding circuit 100 may include a first operand buffer 110, a high-order bit zero determination circuit 120, a clock gating circuit 130, a low-order bit flip-flop 140, and a high-order bit flip-flop 150.

The first operand buffer 110 may store a first operand OP1. The first operand buffer 110 may provide the first operand OP1 to the high-order bit zero determination circuit 120. The first operand OP1 may include first high-order bit data OP1_HO and the first low-order bit data OP1_LO according to the expression of a binary number. The first high-order bit data OP1_HO may include a predetermined number of high-order bit values of the first operand OP1, and the first low-order bit data OP1_LO may include the other bit values of the first operand OP1, excluding the first high-order bit data OP1_HO. The first operand buffer 110 may provide the first low-order bit data OP1_LO to the low-order bit flip-flop 140 and the first high-order bit data OP1_HO to the high-order bit flip-flop 150.

The high-order bit zero determination circuit 120 may analyze the high-order bit values of the first operand OP1 to output the indicator signal HZI. In an embodiment, the high-order bit zero determination circuit 120 may monitor the first high-order bit data OP1_HO included in the first operand OP1. For example, when all bit values of the first high-order bit data OP1_HO are "0," the high-order bit zero determination circuit 120 may generate the indicator signal HZI having a first logic level (e.g., "0"). Similarly, when at least one of the bit values of the first high-order bit data OP1_HO is not "0," the high-order bit zero determination circuit 120 may generate the indicator signal HZI having a second logic level (e.g., "1"). The high-order bit zero determination circuit 120 may provide the indicator signal HZI to the clock gating circuit 130 and output the indicator signal HZI to the first operand holding circuit 100.

The clock gating circuit 130 may perform clock gating on the clock signal CK. The gated clock signal GCK is applied to the high-order bit flip-flop 150, based on the indicator signal HZI. For example, the clock gating circuit 130 may perform clock gating on the clock signal CK using the indicator signal HZI as an enable (EN) signal. For example, the clock gating circuit 130 may generate a gated clock signal GCK by selectively passing the clock signal CK according to the logic level of the indicator signal HZI. For example, the clock gating circuit 130 may not pass the clock signal CK in response to the first logic level of the indicator signal HZI and may output the clock signal CK as the gated clock signal GCK in response to the second logic level of the indicator signal HZI. As a non-limited example, when the clock signal CK is not passed, the gated clock signal GCK may continuously have a value of "0." The clock gating circuit 130 may provide the gated clock signal GCK to the high-order bit flip-flop 150. An example of the clock gating circuit 130 will be described with reference to FIG. 5.

The low-order bit flip-flop 140 may latch the first low-order bit data OP1_LO according to the clock signal CK. To implement such functionality, the low-order bit flip-flop 140 may include various kinds and configurations of flip-flops or latches. However, embodiments are not limited thereto. The low-order bit flip-flop 140 may be replaced by various kinds of memory, registers, or other mechanisms storing a plurality of bits.

The high-order bit flip-flop 150 may latch the first high-order bit data OP1_HO according to the gated clock signal GCK. In other words, the high-order bit flip-flop 150 may output the first high-order bit data OP1_HO at a rising edge and/or a falling edge of the gated clock signal GCK. The high-order bit flip-flop 150 may output the latched first high-order bit data OP1_HO_L. To implement such functionality, the high-order bit flip-flop 150 may include various kinds and configurations of flip-flops or latches. However, embodiments are not limited thereto. The high-order bit flip-flop 150 may be replaced by various kinds of memory storing a plurality of bits.

When the gated clock signal GCK has a value of "0" according to the second logic level of the indicator signal HZI, the latched first high-order bit data OP1_HO_L output from the high-order bit flip-flop 150 may remain at a same or constant value without being updated to a new value.

According to an embodiment, the first operand holding circuit 100 may perform clock gating on the clock signal CK, which is applied to the high-order bit flip-flop 150 related to the first high-order bit data OP1_HO of the first operand OP1. For example, when all bit values of the first high-order bit data OP1_HO are "0," the clock gating circuit 130 may perform clock gating such that the clock signal CK is not applied to the high-order bit flip-flop 150, thereby eliminating unnecessary transition of a signal in a signal line that transmits the first high-order bit data. As the amount of unnecessary signal transitions decreases, the power consumption of the first operand holding circuit 100 and the arithmetic apparatus 10 may be decreased.

Figure 3:
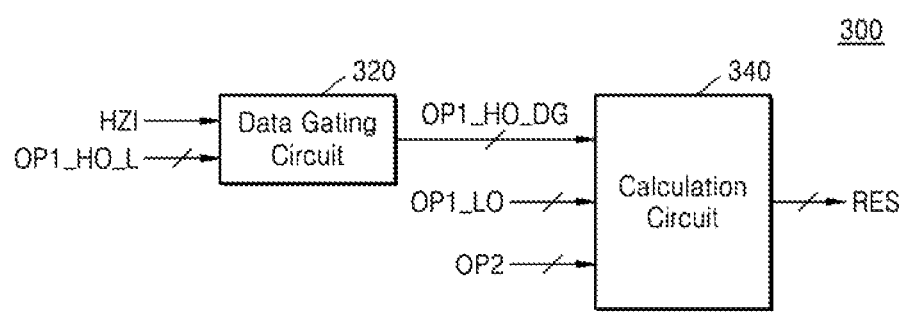
FIG. 3 illustrates an arithmetic circuit according to an embodiment.

FIG. 3 illustrates the arithmetic circuit 300 according to an embodiment. FIG. 3 will be described with reference to FIG. 1.

The arithmetic circuit 300 may include a data gating circuit 320 and a calculation circuit 340.

The data gating circuit 320 may perform data gating on the latched first high-order bit data OP1_HO_L based on the indicator signal HZI. In other words, the data gating circuit 320 may selectively pass the latched first high-order bit data OP1_HO_L according to the logic level of the indicator signal HZI. For example, the data gating circuit 320 may output the latched first high-order bit data OP1_HO_L as data-gated first high-order bit data OP1_HO_DG in response to the first logic level of the indicator signal HZI, and may output "0" as the data-gated first high-order bit data OP1_HO_DG in response to the second logic level of the indicator signal HZI. To implement such functionality, the data gating circuit 320 may include an AND gate performing a logical AND operation using the indicator signal HZI and the latched first high-order bit data OP1_HO_L. This will be described in detail with reference to FIG. 6. The data gating circuit 320 may provide the data-gated first high-order bit data OP1_HO_DG to the calculation circuit 340.

The calculation circuit 340 may perform an operation using a modified first operand, which results from the clock gating of the first operand holding circuit 100 and/or the data gating of the arithmetic circuit 300, and a second operand, and may output the operation result RES. For example, the calculation circuit 340 may perform an operation using the second operand OP2 and the modified first operand including the data-gated first high-order bit data OP1_HO_DG and the first low-order bit data OP1_LO, and may output the operation result RES. Various examples of the calculation circuit 340 will be described in detail with reference to FIGS. 7 through 8B.

According to an embodiment, the arithmetic circuit 300 may perform data gating on the latched first high-order bit data OP1_HO_L. For example, when all bit values of first high-order bit data are "0," the data gating circuit 320 may perform data gating such that the latched first high-order bit data OP1_HO_L is not transmitted to the calculation circuit 340, thereby eliminating unnecessary transition of a signal in a signal line that transmits the first high-order bit data. As the amount of unnecessary signal transitions decreases, the power consumption of the arithmetic circuit 300 and the arithmetic apparatus 10 may be decreased.

Figure 4:
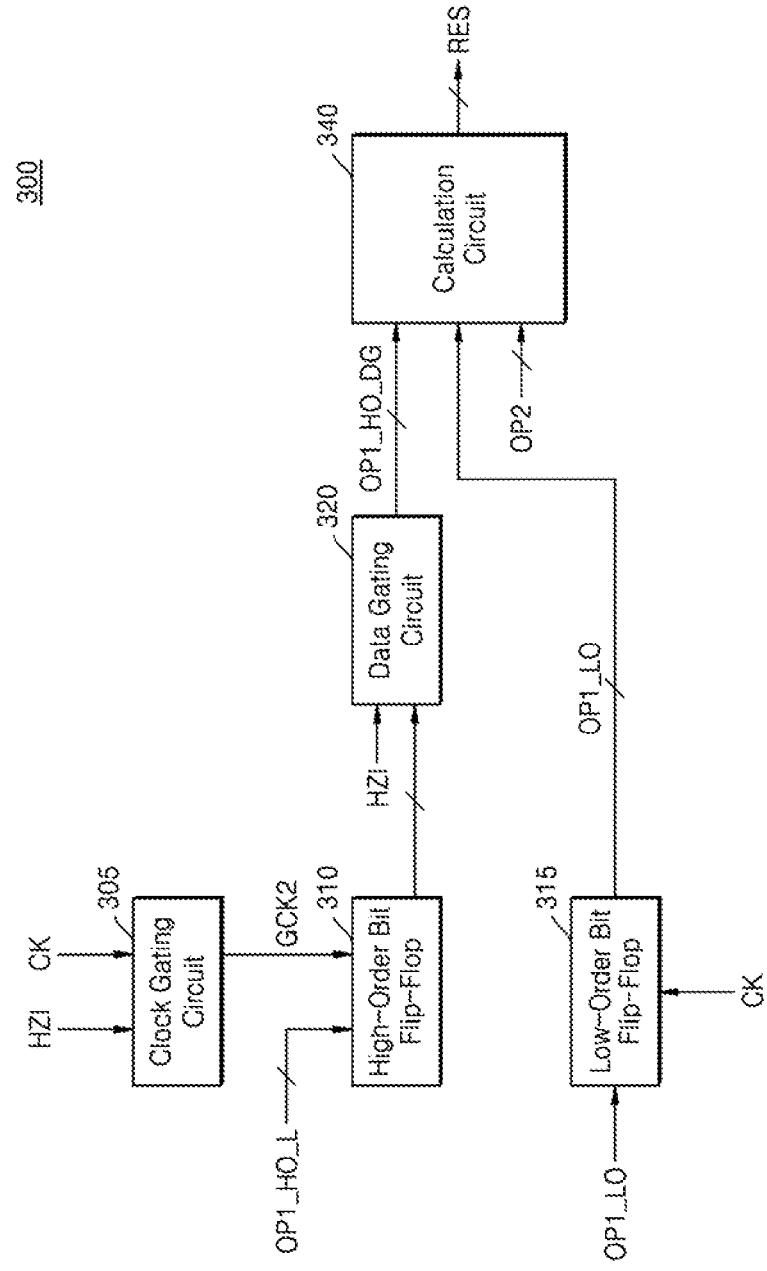
FIG. 4 illustrates an arithmetic circuit according to an embodiment.

FIG. 4 illustrates the arithmetic circuit 300 according to an embodiment. FIG. 4 will be described with reference to FIG. 1.

The arithmetic circuit 300 may include a clock gating circuit 305, a high-order bit flip-flop 310, a low-order bit flip-flop 315, the data gating circuit 320, and the calculation circuit 340. The data gating circuit 320 may operate substantially in a manner similar to the data gating circuit 320 in FIG. 3, and the calculation circuit 340 may operate substantially a manner similar to the calculation circuit 340 in FIG. 3. Accordingly, redundant descriptions thereof will be omitted.

The clock gating circuit 305 may perform clock gating on the clock signal CK, which is applied to the high-order bit flip-flop 310, based on the indicator signal HZI. For example, the clock gating circuit 305 may perform clock gating on the clock signal CK using the indicator signal HZI as an enable (EN) signal. For example, the clock gating circuit 305 may generate a gated clock signal GCK2 by selectively passing the clock signal CK according to the logic level of the indicator signal HZI. For example, the clock gating circuit 305 may not pass the clock signal CK in response to the first logic level of the indicator signal HZI and may output the clock signal CK as the gated clock signal GCK2 in response to the second logic level of the indicator signal HZI. As a non-limited example, when the clock signal CK is not passed, the gated clock signal GCK2 may continuously have a value of "0." The clock gating circuit 305 may provide the gated clock signal GCK2 to the high-order bit flip-flop 310. An example of the clock gating circuit 305 will be described with reference to FIG. 5.

The high-order bit flip-flop 310 may latch the latched first high-order bit data OP1_HO_L according to the gated clock signal GCK2. In other words, the high-order bit flip-flop 310 may output the latched first high-order bit data OP1_HO_L at a rising edge and/or a falling edge of the gated clock signal GCK2. The high-order bit flip-flop 310 may provide latched first high-order bit data OP1_HO_L to the data gating circuit 320. To implement such functionality, the high-order bit flip-flop 310 may include various kinds and configurations of flip-flops or latches. However, embodiments are not limited thereto. The high-order bit flip-flop 310 may be replaced by various kinds of memory storing a plurality of bits.

The low-order bit flip-flop 315 may latch the first low-order bit data OP1_LO according to the clock signal CK. To implement such functionality, the low-order bit flip-flop 315 may include various kinds of flip-flops or latches. However, embodiments are not limited thereto. The low-order bit flip-flop 315 may be replaced by various kinds of memory storing a plurality of bits.

When the gated clock signal GCK2 has a value of "0" according to the second logic level of the indicator signal HZI, the latched first high-order bit data OP1_HO_L output from the high-order bit flip-flop 310 may remain at a constant value without being updated to a new value.

According to an embodiment, the arithmetic circuit 300 may perform clock gating on the clock signal CK applied to the high-order bit flip-flop 310. For example, when all bit values of the first high-order bit data OP1_HO are "0," the clock gating circuit 305 may perform clock gating such that the clock signal CK is not applied to the high-order bit flip-flop 310, thereby eliminating unnecessary transition of a signal in a signal line that transmits the latched first high-order bit data OP1_HO_L. As the amount of unnecessary signal transitions decreases, the power consumption of the arithmetic circuit 300 and the arithmetic apparatus 10 may be correspondingly decreased.

Figure 5:
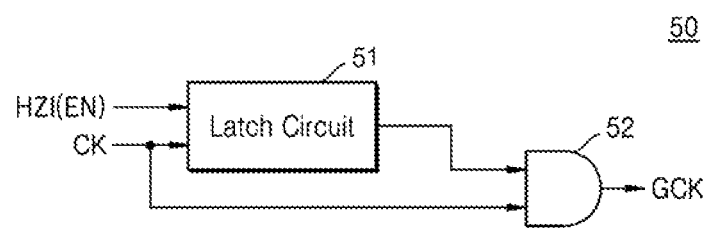
FIG. 5 illustrates a clock gating circuit according to an embodiment.

FIG. 5 illustrates a clock gating circuit 50 according to an embodiment. The clock gating circuit 50 may correspond to the clock gating circuit 130 in FIG. 2 and the clock gating circuit 305 in FIG. 4.

The clock gating circuit 50 may include a latch circuit 51 and an AND gate 52.

The latch circuit 51 may latch the clock signal CK according to an enable signal EN. The latch circuit 51 may receive the indicator signal HZI as the enable signal HZI (EN). The latch circuit 51 may provide a latched clock signal to a first input terminal of the AND gate 52 according to the indicator signal HZI.

The AND gate 52 may output the gated clock signal GCK by performing a logical AND operation using the clock signal CK and the latched clock signal received from the latch circuit 51. To implement such functionality, the latched clock signal may be input to the first input terminal of the AND gate 52 and the clock signal CK may be input to a second input terminal of the AND gate 52.

Although FIG. 5 illustrates an example of the clock gating circuit 50, embodiments are not limited thereto. The clock gating circuit 50 may include various types of circuits that perform the same function (i.e., a function of selectively passing the clock signal CK according to the indicator signal HZI).

Figure 6:
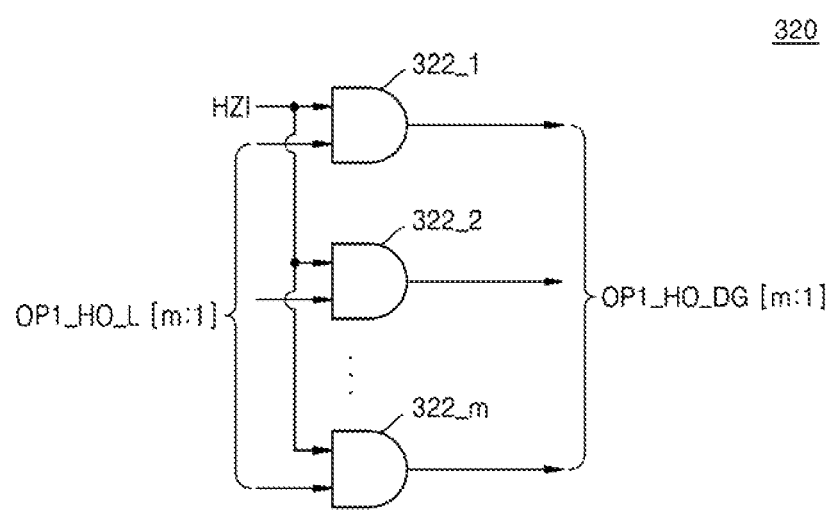
FIG. 6 illustrates a data gating circuit according to an embodiment.

FIG. 6 illustrates the data gating circuit 320 according to an embodiment. The data gating circuit 320 may correspond to the data gating circuit 320 in FIGS. 3 and 4.

The data gating circuit 320 may include at least one AND gate. For example, the data gating circuit 320 may include first through m-th AND gates 322_1, and 322_2 through 322_m. Here, "m" may be the number of bits in the latched first high-order bit data OP1_HO_L. In other words, at least one AND gate may perform a logical AND operation using the indicator signal HZI and a value of each bit in the latched first high-order bit data OP1_HO_L.

At least one AND gate may output the data-gated first high-order bit data OP1_HO_DG by performing a logical AND operation using the indicator signal HZI and the latched first high-order bit data OP1_HO_L. For example, when the indicator signal HZI indicates a first logic level (e.g., "0"), the AND gate may output "0." Similarly, when the indicator signal HZI indicates a second logic level (e.g., "1"), the AND gate may output the latched first high-order bit data OP1_HO_L as the data-gated first high-order bit data OP1_HO_DG.

Although FIG. 6 illustrates an example of the data gating circuit 320, embodiments are not limited thereto. The data gating circuit 320 may include various types of circuits that perform the same function (i.e., a function of selectively passing the latched first high-order bit data OP1_HO_L according to the indicator signal HZI).

Figure 7:
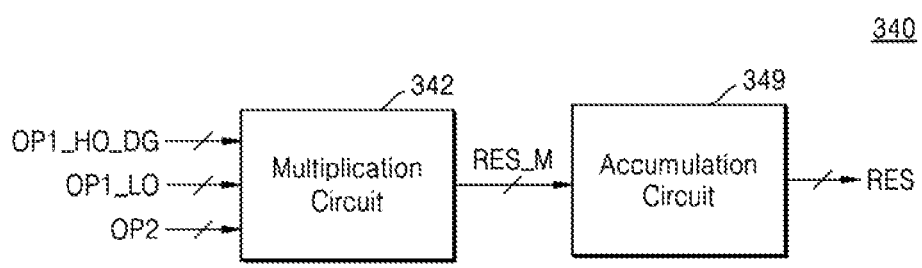
FIG. 7 illustrates a calculation circuit according to an embodiment.

FIG. 7 illustrates the calculation circuit 340 according to an embodiment. In particular, the calculation circuit 340 may correspond to an embodiment in which the arithmetic circuit 300 in FIG. 1 performs convolution using a first operand or a first operand set including the first operand and a second operand or a second operand set including the second operand OP2. The convolution may be implemented by multiplication and accumulation (adding up, summation) of operands. FIG. 7 will be described with reference to FIGS. 1 and 3.

The calculation circuit 340 may include a multiplication circuit 342 and an accumulation circuit 349.

The multiplication circuit 342 may perform multiplication using the second operand OP2 and a modified first operand including the data-gated first high-order bit data OP1_HO_DG and the first low-order bit data OP1_LO. The multiplication circuit 342 may output a multiplication result RES_M. The multiplication circuit 342 may provide the multiplication result RES_M to the accumulation circuit 349. The multiplication circuit 342 may be implemented by examples described with respect to FIGS. 8A and 8B.

The accumulation circuit 349 may accumulate a plurality of values of the multiplication result RES_M output by the multiplication circuit 342. The accumulation circuit 349 may output the operation result RES by adding up the plurality of accumulated multiplication results RES_M with respect to a first operand set including a first operand and a second operand set including a second operand. To implement such functionality, the accumulation circuit 349 may include a memory, such as a buffer or register, which stores the multiplication result RES_M, and an adder, which adds up a plurality of multiplication results. The accumulation circuit 349 may individually store a plurality of multiplication results and then generate the operation result RES by adding up the multiplication results, but embodiments are not limited thereto. The accumulation circuit 349 may update a temporary sum value each time the multiplication result RES_M is received and may output a lastly updated sum value as the operation result RES.

Figure 8A:
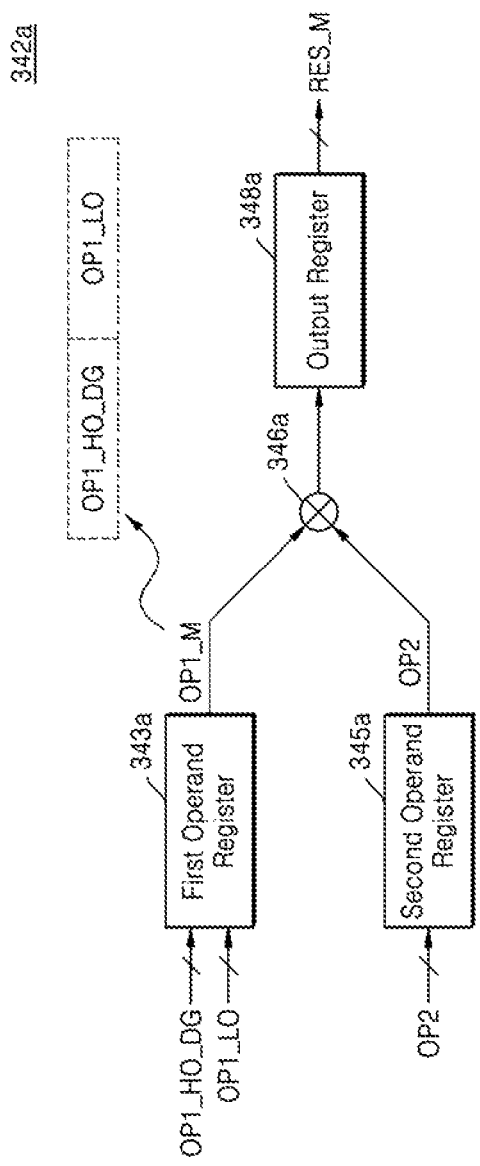
FIGS. 8A and 8B illustrate multiplication circuits, respectively, according to embodiments.
Figure 8B:
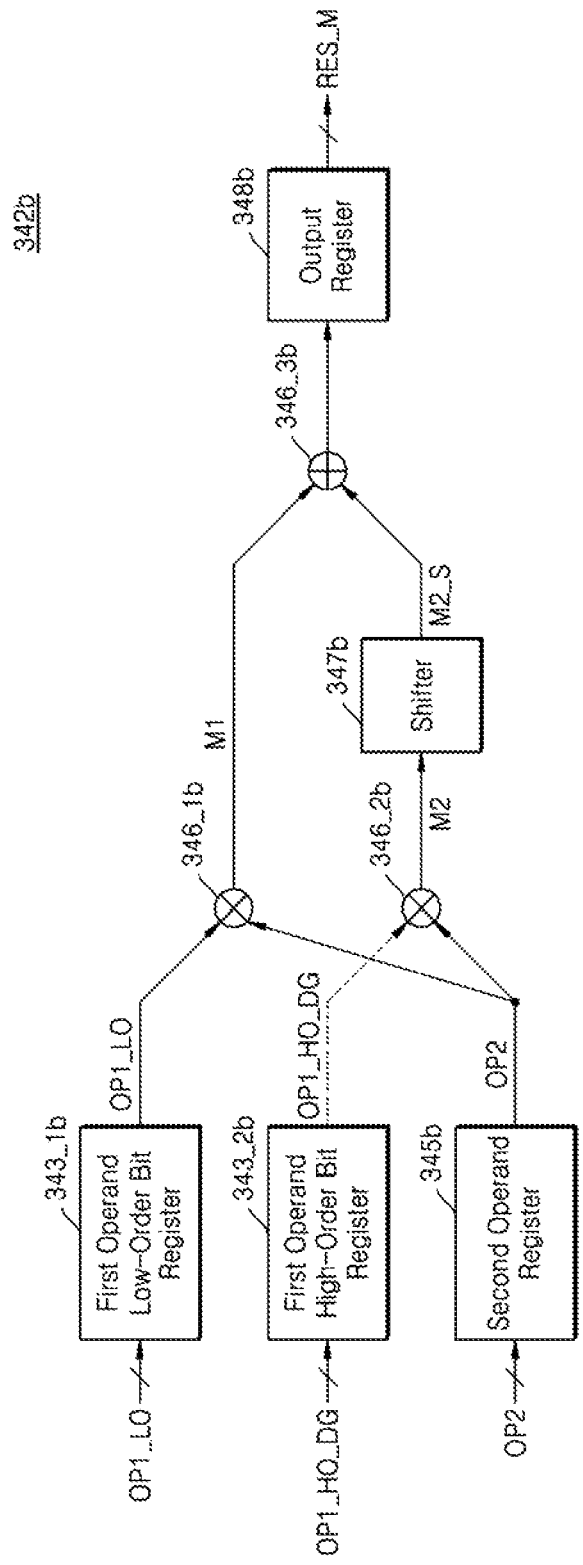

FIGS. 8A and 8B illustrate multiplication circuits 342a and 342b, respectively, according to embodiments. The multiplication circuits 342a and 342b may correspond to the multiplication circuit 342 in FIG. 7. Additionally, FIGS. 8A and 8B will be described with reference to FIGS. 1 through 3 and FIG. 7.

Referring to FIG. 8A, the multiplication circuit 342a may include a first operand register 343a, a second operand register 345a, a multiplier 346a, and an output register 348a.

The first operand register 343a may temporarily store and output a modified first operand OP1_M. The modified first operand OP1_M may include the data-gated first high-order bit data OP1_HO_DG and the first low-order bit data OP1_LO. For example, the modified first operand OP1_M may be formed by adding, as a high-order bit, the data-gated first high-order bit data OP1_HO_DG to the first low-order bit data OP1_LO.

In detail, for example, when the indicator signal HZI has the first logic level, the data-gated first high-order bit data OP1_HO_DG may be "0," and accordingly, the modified first operand OP1_M may be formed by adding "0" as a high-order bit to the first low-order bit data OP1_LO. For example, when each of the first high-order bit data OP1_HO and the first low-order bit data OP1_HO_DG is 4-bit data and the indicator signal HZI has the first logic level, the modified first operand OP1_M may be formed by adding "0000" as high-order bits to the first low-order bit data OP1_LO.

When the indicator signal HZI has the second logic level, the data-gated first high-order bit data OP1_HO_DG may be the same as the first high-order bit data OP1_HO. Accordingly, the modified first operand OP1_M may be the same as data, i.e., the first operand OP1, formed by adding the first high-order bit data OP1_HO to the first low-order bit data OP1_LO.

The second operand register 345a may temporarily store and output the second operand OP2.

The multiplier 346a may generate the multiplication result RES_M by performing multiplication using the modified first operand OP1_M and the second operand OP2. For example, when each of the first operand OP1 and the second operand OP2 is 8-bit data, the multiplier 346a may include an 8×8-bit multiplier or a 9×9-bit multiplier.

The output register 348a may temporarily store the multiplication result RES_M and may output the multiplication result RES_M as output (e.g., to the accumulation circuit 349) of the multiplication circuit 342a.

Referring to FIG. 8B, the multiplication circuit 342b may include a first operand low-order bit register 343_1b, a first operand high-order bit register 343_2b, a second operand register 345b, a first multiplier 346_1b, a second multiplier 346_2b, an adder 346_3b, a shifter 347b, and an output register 348b.

The first operand low-order bit register 343_1b may temporarily store the first low-order bit data OP1_LO. The first operand high-order bit register 343_2b may temporarily store the data-gated first high-order bit data OP1_HO_DG. The second operand register 345*b* may temporarily store the second operand OP2.

The first multiplier 346_1*b* may output a first multiplication result M1 by multiplying the first low-order bit data OP1_LO by the second operand OP2. For example, when the first low-order bit data OP1_LO is 4-bit data and the second operand OP2 is 8-bit data, the first multiplier 346_1*b* may include a 4×8-bit multiplier or a 5×9-bit multiplier.

The second multiplier 346_2*b* may output a second multiplication result M2 by multiplying the data-gated first high-order bit data OP1_HO_DG by the second operand OP2. For example, when the first high-order bit data OP1_HO is 4-bit data and the second operand OP2 is 8-bit data, the second multiplier 346_2*b* may include a 4×8-bit multiplier or a 5×9-bit multiplier.

The shifter 347*b* may output a shifted second multiplication result M2_S by shifting the second multiplication result M2 by the number of bits in the first low-order bit data OP1_LO.

The adder 346_3*b* may output the multiplication result RES_M by adding the multiplication result M1 to the shifted second multiplication result M2_S.

The output register 348*b* may temporarily store the multiplication result RES_M and output the multiplication result RES_M as output (e.g., to the accumulation circuit 349) of the multiplication circuit 342*b*.

Figure 9:
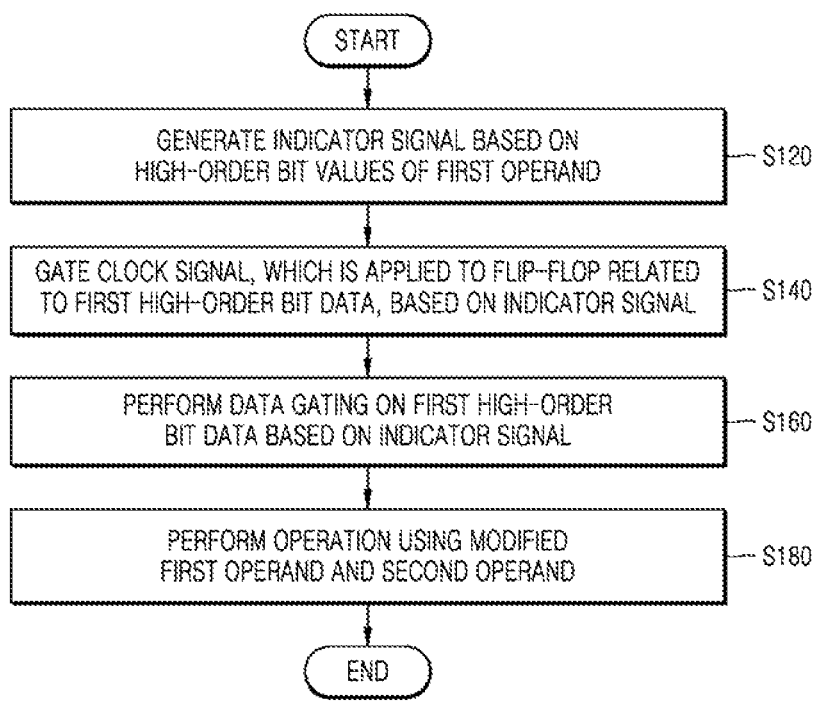
FIG. 9 is a flowchart of an operating method of an arithmetic apparatus, according to an embodiment.

FIG. 9 is a flowchart of an operating method of an arithmetic apparatus, according to an embodiment. FIG. 9 will be described with reference to FIGS. 1 through 8.

The arithmetic apparatus 10 may generate the indicator signal HZI based on high-bit values of the first operand OP1 in operation SI20. For example, the high-order bit zero determination circuit 120 of the first operand holding circuit 100 may monitor the first high-order bit data OP1_HO including high-order bit values included in the first operand OP1 and may generate the indicator signal HZI indicating whether all bit values of the first high-order bit data OP1_HO are a same value (e.g., "0").

The arithmetic apparatus 10 may gate the clock signal CK, which is applied to a flip-flop related to the first high-order bit data OP1_HO, based on the indicator signal HZI in operation S140. For example, the clock gating circuit 130 of the first operand holding circuit 100 may gate the clock signal CK, which is applied to the high-order bit flip-flop 150, based on the logic level of the indicator signal HZI. Similarly, for example, the clock gating circuit 305 of the arithmetic circuit 300 may gate the clock signal CK, which is applied to the high-order bit flip-flop 310, based on the logic level of the indicator signal HZI.

The arithmetic apparatus 10 may perform data gating on the first high-order bit data OP1_HO based on the indicator signal HZI in operation S160. For example, the data gating circuit 320 of the arithmetic circuit 300 may generate the data-gated first high-order bit data OP1_HO_DG by gating the latched first high-order bit data OP1_HO_L based on the logic level of the indicator signal HZI.

The arithmetic apparatus 10 may output the operation result RES by performing an operation using the modified first operand OP1_M and the second operand OP2 in operation S180. The modified first operand OP1_M may include the data-gated first high-order bit data OP1_HO_DG and the first low-order bit data OP1_LO.

Figure 10:
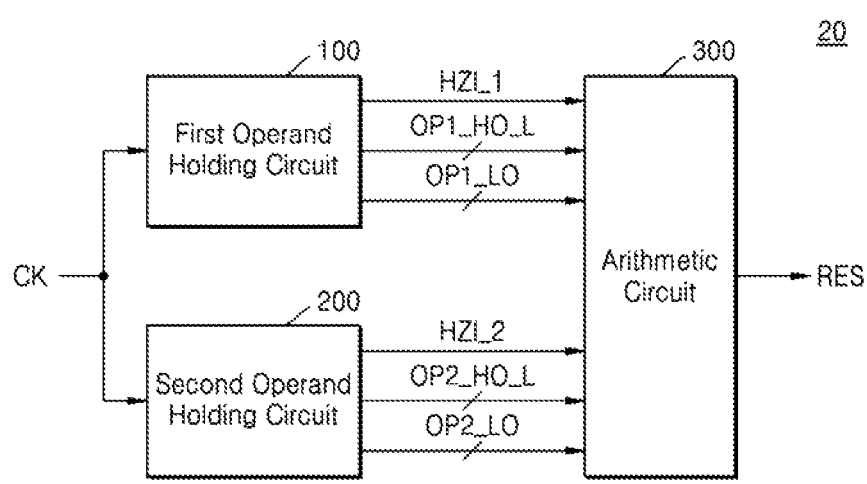
FIG. 10 illustrates an arithmetic apparatus according to an embodiment.

FIG. 10 illustrates an arithmetic apparatus 20 according to an embodiment. The arithmetic apparatus 20 may include the first operand holding circuit 100, the second operand holding circuit 200, and the arithmetic circuit 300. FIG. 10 will be described focusing on the differences between the arithmetic apparatus 20 and the arithmetic apparatus 10 described with reference to FIGS. 1 through 9.

The first operand holding circuit 100 may be substantially the same as the first operand holding circuit 100 described with reference to FIGS. 1 through 9. However, the indicator signal HZI in FIGS. 1 through 9 is renamed a first indicator signal HZI_1.

Unlike the second operand holding circuit 200 outputting the second operand OP2 in FIGS. 1 through 9, the second operand holding circuit 200 in FIG. 10 may output a second indicator signal HZI_2, latched second high-order bit data OP2_HO_L, and second low-order bit data OP2_LO, like the first operand holding circuit 100 in FIGS. 1 through 9.

In other words, a second operand may include second high-order bit data and the second low-order bit data OP2_LO. For example, the second high-order bit data may include a predetermined number of high-order bit values of the second operand expressed as a binary number, and the second low-order bit data OP2_LO may include the other bit values of the second operand, excluding the second high-order bit data.

In an embodiment, the second operand holding circuit 200 may generate the second indicator signal HZI_2 based on the bit values of the second high-order bit data OP2_HO and may provide the second indicator signal HZI_2 to the arithmetic circuit 300. The second indicator signal HZI_2 may indicate whether all bit values of the second high-order bit data are the same value (e.g., "0"). For example, when all bit values of the second high-order bit data are "0," the second indicator signal HZI_2 may have a first logic level (e.g., "0"), and when at least one of the bit values of the second high-order bit data is not "0," the second indicator signal HZI_2 may have a second logic level (e.g., "1"), which is different from the first logic level. In other words, the second operand holding circuit 200 may monitor the high-order bit values of the second operand to output the second indicator signal HZI_2.

In an embodiment, the second operand holding circuit 200 may include a high-order bit flip-flop, which latches the second high-order bit data OP2_HO to generate the latched second high-order bit data OP2_HO_L, and a low-order bit flip-flop, which latches the second low-order bit data OP2_LO. The second operand holding circuit 200 may perform clock gating on the clock signal CK, which is applied to the high-order bit flip-flop, according to the logic level of the second indicator signal HZI_2. In other words, the second operand holding circuit 200 may generate a gated clock signal by selectively passing the clock signal CK based on the logic level of the second indicator signal HZI_2 and may provide the gated clock signal to the high-order bit flip-flop. The high-order bit flip-flop may latch the second high-order bit data OP2_HO according to the gated clock signal and output the latched second high-order bit data OP2_HO_L. The second operand holding circuit 200 may provide the latched second high-order bit data OP2_HO_L, the second indicator signal HZI_2, and the second low-order bit data OP2_LO to the arithmetic circuit 300.

The operation of the arithmetic circuit 300 may be substantially the same as or similar to those of the arithmetic circuit 300 described with reference to FIGS. 1 through 9. Additionally, the arithmetic circuit 300 may perform data gating on the latched second high-order bit data OP2_HO_L based on the second indicator signal HZI_2. The arithmetic circuit 300 may also gate a clock signal, which is applied to a flip-flop related to the latched second high-order bit data OP2_HO_L, based on the second indicator signal HZI_2, and may perform an operation based on a modified second operand, which results from the clock gating and/or the data gating. In other words, the arithmetic circuit 300 may output the operation result RES by performing an operation using the modified first operand and the modified second operand.

Figure 11A:
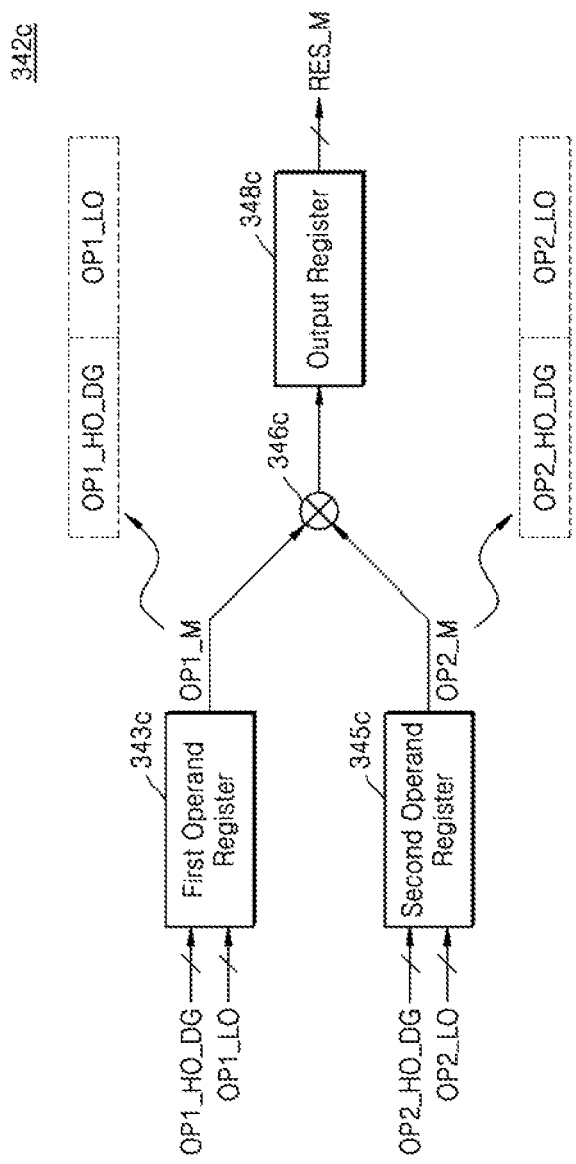
FIGS. 11A and 11B illustrate multiplication circuits, respectively, according to embodiments.
Figure 11B:
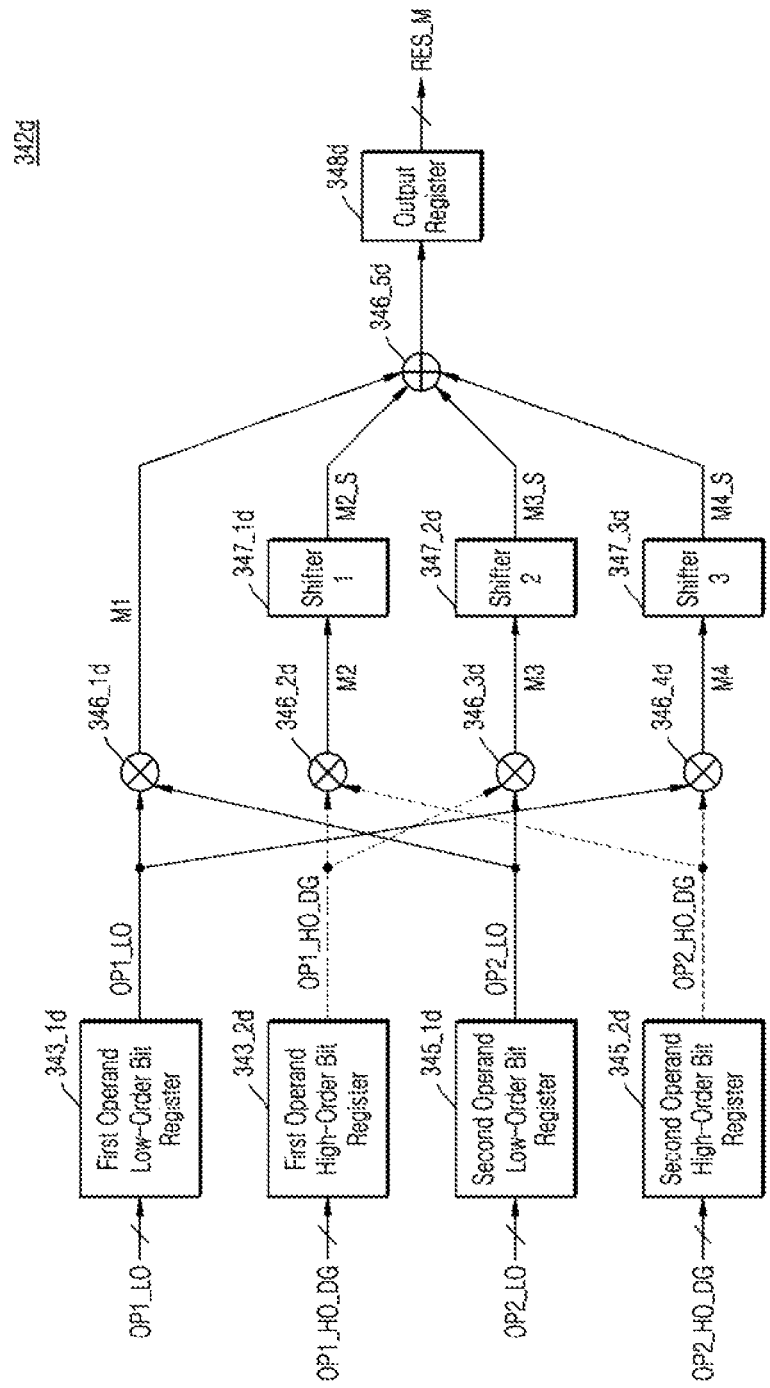

FIGS. 11A and 11B illustrate multiplication circuits 342c and 342d, respectively, according to embodiments. In particular, FIGS. 11A and 11B may illustrate examples of a multiplication circuit included in the arithmetic circuit 300 of the arithmetic apparatus 20 when the arithmetic circuit 300 performs convolution.

Referring to FIG. 11A, the multiplication circuit 342c may include a first operand register 343c, a second operand register 345c, a multiplier 346c, and an output register 348c.

The first operand register 343c may temporarily store and output the modified first operand OP1_M. The modified first operand OP1_M may include the data-gated first high-order bit data OP1_HO_DG and the first low-order bit data OP1_LO. For example, the modified first operand OP1_M may be formed by adding, as a high-order bit, the data-gated first high-order bit data OP1_HO_DG to the first low-order bit data OP1_LO.

The second operand register 345c may temporarily store and output a modified second operand OP2_M. The modified second operand OP2_M may include data-gated second high-order bit data OP2_HO_DG and the second low-order bit data OP2_LO. For example, the modified second operand OP2_M may be formed by adding, as a high-order bit, the data-gated second high-order bit data OP2_HO_DG to the second low-order bit data OP2_LO.

The multiplier 346c may generate the multiplication result RES_M by performing multiplication using the modified first operand OP1_M and the modified second operand OP2_M. For example, when each of the first operand OP1 and the second operand OP2 is 8-bit data, the multiplier 346c may include an 8×8-bit multiplier or a 9×9-bit multiplier.

The output register 348c may temporarily store the multiplication result RES_M and may output the multiplication result RES_M as output of the multiplication circuit 342c.

Referring to FIG. 11B, the multiplication circuit 342d may include a first operand low-order bit register 343_1d, a first operand high-order bit register 343_2d, a second operand low-order bit register 345_1d, a second operand high-order bit register 345_2d, a first multiplier 346_1d, a second multiplier 346_2d, a third multiplier 346_3d, a fourth multiplier 346_4d, a first shifter 347_1d, a second shifter 347_2d, a third shifter 347_3d, an adder 346_5d, and an output register 348d.

The first operand low-order bit register 343_1d may temporarily store and output the first low-order bit data OP1_LO. The first operand high-order bit register 343_2d may temporarily store and output the data-gated first high-order bit data OP1_HO_DG. The second operand low-order bit register 345_1d may temporarily store and output the second low-order bit data OP2_LO. The second operand high-order bit register 345_2d may temporarily store and output the data-gated second high-order bit data OP2_HO_DG.

The first multiplier 346_1d may output the first multiplication result M1 by multiplying the first low-order bit data OP1_LO by the second low-order bit data OP2_LO. For example, when the first low-order bit data OP1_LO is 4-bit data and the second low-order bit data OP2_LO is 4-bit data, the first multiplier 346_1d may include a 4×4-bit multiplier or a 5×5-bit multiplier.

The second multiplier 346_2d may output the second multiplication result M2 by multiplying the data-gated first high-order bit data OP1_HO_DG by the data-gated second high-order bit data OP2_HO_DG. For example, when first high-order bit data is 4-bit data and second high-order bit data is 4-bit data, the second multiplier 346_2d may include a 4×4-bit multiplier or a 5×5-bit multiplier.

The third multiplier 346_3d may output a third multiplication result M3 by multiplying the data-gated first high-order bit data OP1_HO_DG by the second low-order bit data OP2_LO. For example, when the first high-order bit data is 4-bit data and the second low-order bit data OP2_LO is 4-bit data, the third multiplier 346_3d may include a 4×4-bit multiplier or a 5×5-bit multiplier.

The fourth multiplier 346_4d may output a fourth multiplication result M4 by multiplying the first low-order bit data OP1_LO by the data-gated second high-order bit data OP2_HO_DG. For example, when the first low-order bit data OP1_LO is 4-bit data and the second high-order bit data is 4-bit data, the fourth multiplier 346_4d may include a 4×4-bit multiplier or a 5×5-bit multiplier.

The first shifter 347_1d may output the shifted second multiplication result M2_S by shifting the second multiplication result M2 by the sum of the number of bits in the first low-order bit data OP1_LO and the number of bits in the second low-order bit data OP2_LO.

The second shifter 347_2d may output a shifted third multiplication result M3_S by shifting the third multiplication result M3 by the number of bits in the first low-order bit data OP1_LO.

The third shifter 347_3d may output a shifted fourth multiplication result M4_S by shifting the fourth multiplication result M4 by the number of bits in the second low-order bit data OP2_LO.

The adder 346_5d may output the multiplication result RES_M by adding up the first multiplication result M1, the shifted second multiplication result M2_S, the shifted third multiplication result M3_S, and the shifted fourth multiplication result M4_S.

The output register 348d may temporarily store the multiplication result RES_M and output the multiplication result RES_M to the outside of the multiplication circuit 342d.

Figure 12:
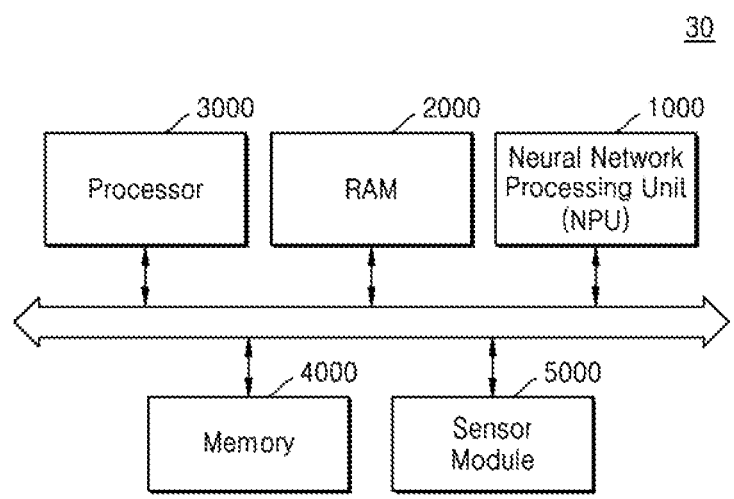
FIG. 12 illustrates an electronic system according to an embodiment.

FIG. 12 illustrates an electronic system 30 according to an embodiment. The electronic system 30 may analyze input data in real time based on a neural network, obtain valid information, and identify a situation or control elements of an electronic device equipped with the electronic system 30 based on the valid information. For example, the electronic system 30 may be applied to a drone, a robot device like an advanced driver assistance system (ADAS), a smart television (TV), a smart phone, a medical device, a mobile device, an image display, a measuring device, an Internet of things (IoT) device, etc. The electronic system 30 may be implemented in any one of other various kinds of electronic devices. Hereinafter, a device using the electronic system 30 accelerating a neural network is referred to as a neural network device.

The electronic system 30 may include a neural network processing unit (NPU) 1000, random access memory (RAM) 2000, a processor 3000, memory 4000, and a sensor module 5000. The components of the electronic system 30 may be connected to each other through one or more communication lines or busses. The NPU 1000 may be referred to as a neural network processor 1000.

The NPU 1000 may generate a neural network, train or learn a neural network, perform an operation based on input data and generate an information signal based on an operation result, or retrain a neural network. Neural network models may include various kinds of models, such as a convolutional neural network (CNN) like GoogleNet, AlexNet, or VGG network, a region with CNN (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, and a classification network, but are not limited thereto. The NPU 1000 may include at least one processor that performs operations according to neural network models. The NPU 1000 may include separate memory that stores programs corresponding to respective neural network models.

The NPU 1000 may receive various kinds of input data through a system bus and may generate an information signal based on the input data. For example, the NPU 1000 may generate an information signal by performing a neural network operation on input data, and the neural network operation may include convolution. The information signal generated by the NPU 1000 may include at least one selected from various kinds of recognition signals such as a voice recognition signal, a thing recognition signal, an image recognition signal, and a biometric recognition signal. For example, the NPU 1000 may receive frame data included in a video stream as input data and may generate a recognition signal with respect to a thing, which is included in an image represented by the frame data, from the frame data. However, embodiments are not limited thereto. The NPU 1000 may receive various kinds of input data and generate a recognition signal based on the input data.

The RAM 2000 may temporarily store programs, data, or instructions. Programs and/or data stored in the memory 4000 may be temporarily loaded to the RAM 2000 according to the control of the processor 3000 or booting code. The RAM 2000 may be implemented using memory such as dynamic RAM (DRAM) or static RAM (SRAM).

The processor 3000 may control all operations of the electronic system 30. For example, the processor 3000 may be implemented as a central processing unit (CPU). The processor 3000 may include a single core or multiple cores. The processor 3000 may process or execute programs and/or data, which are stored in the RAM 2000 and the memory 4000. For example, the processor 3000 may control functions of the electronic system 30 by executing programs stored in the memory 4000.

The memory 4000 is storage for storing data and may store, for example, an operating system (OS), various programs, and various data. The memory 4000 may include DRAM but is not limited thereto. The memory 4000 may include at least one selected from volatile memory and non-volatile memory. The non-volatile memory may include read-only memory (ROM), programmable ROM (PROM), electrically programmable ROM (EPROM), electrically erasable programmable ROM (EEPROM), flash memory, phase-change RAM (PRAM), magnetic RAM (MRAM), resistive RAM (RRAM), and ferroelectric RAM (FRAM). The volatile memory may include DRAM, SRAM, and synchronous DRAM (SDRAM). In an embodiment, the memory 4000 may include at least one selected from a hard disk drive (HDD), a solid state drive (SSD), compact flash (CF) memory, secure digital (SD) memory, micro-SD memory, mini-SD memory, extreme digital (xD) memory, and a memory stick.

The sensor module 5000 may collect surrounding information of the electronic system 30. The sensor module 5000 may sense or receive an image signal from outside the electronic system 30 and may convert the image signal into image data, e.g., an image frame. For this operation, the sensor module 5000 may include at least one sensing device selected from various sensing devices, such as an image pickup device, an image sensor, a light detection and ranging (LIDAR) sensor, an ultrasonic sensor, and an infrared sensor, or may receive a sensing signal from the sensing device. In an embodiment, the sensor module 5000 may provide the image frame to the NPU 1000. For example, the sensor module 5000 may include an image sensor and may generate a video stream by capturing surroundings of the electronic system 30 and sequentially provide consecutive image frames in the video stream to the NPU 1000.

According to an embodiment, the NPU 1000 of the electronic system 30 may be implemented as the arithmetic apparatus 10 described with reference to FIGS. 1 through 9 or the arithmetic apparatus 20 described with reference to FIGS. 10 through 11B. This will be described in detail with reference to FIGS. 13 through 15.

Figure 13:
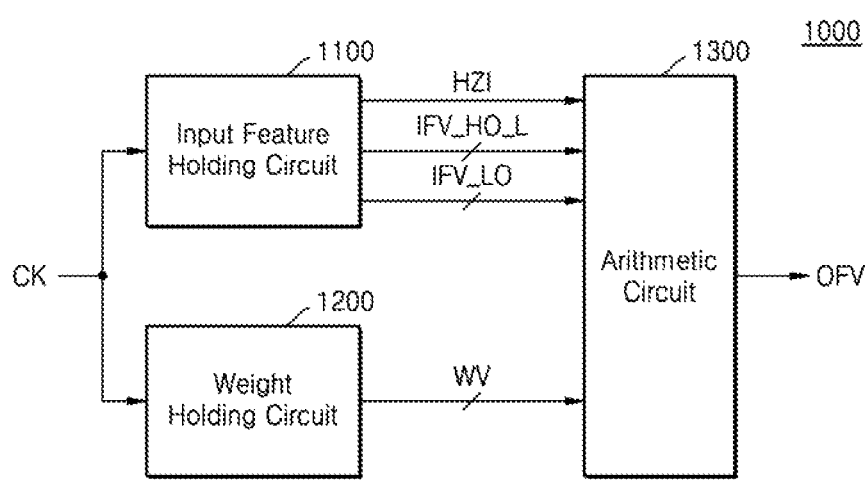
FIG. 13 illustrates a neural network processor according to an embodiment.

FIG. 13 illustrates a neural network processor 1000 according to an embodiment. The neural network processor 1000 of FIG. 13 may correspond to the NPU 1000 of FIG. 12.

The neural network processor 1000 of FIG. 13 may include an input feature holding circuit 1100, a weight holding circuit 1200, and an arithmetic circuit 1300.

In particular, FIG. 13 may illustrate an example in which the arithmetic apparatus 10 described with reference to FIGS. 1 through 9 is applied to the neural network processor 1000.

The input feature holding circuit 1100 may correspond to the first operand holding circuit 100 in FIG. 1, the weight holding circuit 1200 may correspond to the second operand holding circuit 200 in FIG. 1, and the arithmetic circuit 1300 may correspond to the arithmetic circuit 300 in FIG. 1. An input feature value may correspond to a first operand, and a weight value WV may correspond to a second operand. The input feature value may be a value that is included in an input feature map used in the convolution operation of the neural network processor 1000. The weight value WV may be a value that is included in a weight matrix used in the convolution operation of the neural network processor 1000. Latched input feature high-order bit data IFV_HO_L may correspond to the latched first high-order bit data OP1_HO_L in FIG. 1. Input feature low-order bit data IFV_LO may correspond to the first low-order bit data OP1_LO in FIG. 1. An output feature value OFV may correspond to the operation result RES.

Figure 14:
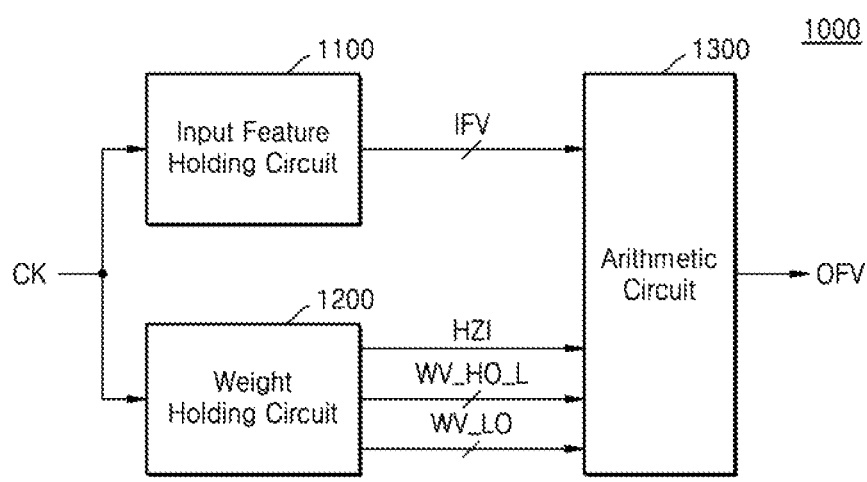
FIG. 14 illustrates a neural network processor according to an embodiment.

FIG. 14 illustrates the neural network processor 1000 according to an embodiment. The neural network processor 1000 of FIG. 14 may correspond to the NPU 1000 of FIG. 12.

The neural network processor 1000 of FIG. 14 may include the input feature holding circuit 1100, the weight holding circuit 1200, and the arithmetic circuit 1300.

In particular, FIG. 14 may illustrate an example in which the arithmetic apparatus 10 described with reference to FIGS. 1 through 9 is applied to the neural network processor 1000.

The weight holding circuit 1200 may correspond to the first operand holding circuit 100 in FIG. 1, the input feature holding circuit 1100 may correspond to the second operand holding circuit 200 in FIG. 1, and the arithmetic circuit 1300 may correspond to the arithmetic circuit 300 in FIG. 1. A weight value may correspond to a first operand and an input feature value IFV may correspond to a second operand.

Latched weight high-order bit data WV_HO_L may correspond to the latched first high-order bit data OP1_HO_L in FIG. 1. Weight low-order bit data WV_LO may correspond to the first low-order bit data OP1_LO in FIG. 1. The output feature value OFV may correspond to the operation result RES.

Figure 15:
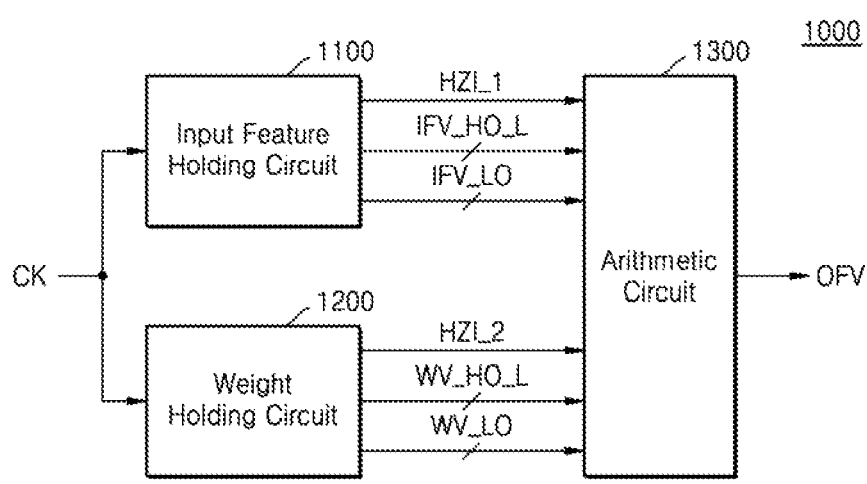
FIG. 15 illustrates a neural network processor according to an embodiment.

FIG. 15 illustrates the neural network processor 1000 according to an embodiment. The neural network processor 1000 of FIG. 15 may correspond to the NPU 1000 of FIG. 12.

The neural network processor 1000 of FIG. 15 may include the input feature holding circuit 1100, the weight holding circuit 1200, and the arithmetic circuit 1300.

In particular, FIG. 15 may illustrate an example in which the arithmetic apparatus 20 described with reference to FIGS. 10 through 11B is applied to the neural network processor 1000.

The input feature holding circuit 1100 may correspond to the first operand holding circuit 100 in FIG. 10, the weight holding circuit 1200 may correspond to the second operand holding circuit 200 in FIG. 10, and the arithmetic circuit 1300 may correspond to the arithmetic circuit 300 in FIG. 10. An input feature value may correspond to a first operand and a weight value may correspond to a second operand. The latched input feature high-order bit data IFV_HO_L may correspond to the latched first high-order bit data OP1_HO_L in FIG. 10. The input feature low-order bit data IFV_LO may correspond to the first low-order bit data OP1_LO in FIG. 10. The latched weighted high-order bit data WV_HO_L may correspond to the latched second high-order bit data OP2_HO_L in FIG. 10. The weighted low-order bit data WV_LO may correspond to the second low-order bit data OP2_LO in FIG. 10. The output feature value OFV may correspond to the operation result RES.

While aspects have been particularly shown and described with reference to embodiments thereof, it will be understood that various changes in form and details may be made therein without departing from the spirit and scope of the following claims.

What is claimed is:

1. An arithmetic apparatus for use in a neural network to perform real time analysis of input data under a power consumption constraint, the arithmetic apparatus comprising:
a first operand holding circuit configured to:
generate an indicator signal based on bit values of high-order bit data of a first operand, wherein the first operand is included in an input feature map of the neural network, and wherein the first operand is input to the first operand holding circuit, the high-order bit data of the first operand including a most significant bit of the first operand,
gate a clock signal, wherein the clock signal is input to the first operand holding circuit based on the indicator signal, to generate a first gated clock signal,
generate latched high-order bit data of the first operand based on the first gated clock signal being applied to a flip-flop latching the high-order bit data of the first operand, and
output bit data of the first operand, the bit data of the first operand comprising the latched high-order bit data of the first operand and low-order bit data of the first operand;
a second operand holding circuit configured to maintain and output a second operand input to the second operand holding circuit based on the clock signal, regardless of bit values of high-order bit data of the second operand including the most significant bit of the second operand, wherein the second operand is included in a weight matrix of the neural network; and
an arithmetic circuit comprises:
a first clock gating circuit configured to generate a second gated clock signal by gating the clock signal based on the logic level of the indicator signal; and
a high-order bit flip-flop configured to receive the latched high-order bit data of the first operand from the first operand holding circuit, receive the second gated clock signal from the first clock gating circuit, and latch the latched high-order bit data of the first operand based on the second gated clock signal,
wherein the arithmetic circuit is further configured to:
perform data gating on the latched high-order bit data of the first operand based on the indicator signal, to generate data-gated high-order bit data of the first operand, and
output an operation result by performing an operation using a modified first operand comprising the data-gated high-order bit data of the first operand and the low-order bit data of the first operand and the second operand, wherein the operation result corresponds to a convolution operation of the neural network based on the input feature map and the weight matrix.

2. The arithmetic apparatus of claim 1, wherein the first operand holding circuit comprises a zero determination circuit configured to generate the indicator signal having a first logic level based on all the bit values of the high-order bit data of the first operand being "0" and a second logic level based on at least one of the bit values of the high-order bit data of the first operand not being "0".

3. The arithmetic apparatus of claim 1, wherein the first operand holding circuit comprises:
a high-order bit flip-flop configured to latch the high-order bit data of the first operand based on the first gated clock signal, to generate the latched high-order bit data of the first operand; and
a low-order bit flip-flop configured to latch the low-order bit data of the first operand based on the clock signal.

4. The arithmetic apparatus of claim 3, wherein the first operand holding circuit further comprises a second clock gating circuit configured to generate the first gated clock signal by gating the clock signal according to a logic level of the indicator signal and provide the first gated clock signal to the high-order bit flip-flop.

5. The arithmetic apparatus of claim 1, wherein the arithmetic circuit comprises:
a data gating circuit configured to generate the data-gated high-order bit data of the first operand by selectively passing the latched high-order bit data of the first operand based on a logic level of the indicator signal; and
a calculation circuit configured to generate the operation result by performing the operation using the data-gated high-order bit data of the first operand, the low-order bit data of the first operand, and the second operand.

6. The arithmetic apparatus of claim 5, wherein the arithmetic circuit further comprises:
a low-order bit flip-flop configured to latch the low-order bit data of the first operand based on the clock signal.

7. The arithmetic apparatus of claim 5, wherein the arithmetic circuit further comprises:
a multiplication circuit configured to generate a multiplication result by performing multiplication using the modified first operand and the second operand, and an accumulation circuit configured to output the operation result by accumulating and summing at least one value of the multiplication result.

8. The arithmetic apparatus of claim 5, wherein the multiplication circuit comprises:
a first multiplier configured to generate a first multiplication result by multiplying the low-order bit data of the first operand by the second operand;
a second multiplier configured to generate a second multiplication result by multiplying the data-gated high-order bit data of the first operand by the second operand;
a shifter configured to generate a shifted second multiplication result by shifting the second multiplication result by a number of bits in the low-order bit data of the first operand; and
an adder configured to add the shifted second multiplication result to the first multiplication result.

9. An arithmetic apparatus for use in a neural network to perform real time analysis of input data under a power consumption constraint, the arithmetic apparatus comprising:
a first operand holding circuit configured to generate a first gated clock signal by gating a clock signal based on the logic level of an indication signal generated based on bit values of high-order bit data of a first operand, latch the high-order bit data of the first operand based on the first gated clock signal, output a modified first operand based on the first gated clock signal and the clock signal, the modified first operand comprising a first latched high-order bit data of the first operand, wherein the first operand is included in an input feature map of the neural network, and wherein the first operand is input to the first operand holding circuit, and low-order bit data of the first operand;
a second operand holding circuit configured to maintain and output a second operand input to the second operand holding circuit based on the clock signal, regardless of bit values of high-order bit data of the second operand including the most significant bit of the second operand, wherein the second operand is included in a weight matrix of the neural network; and
an arithmetic circuit configured to output an operation result by performing an operation using the modified first operand and the second operand, wherein the operation result corresponds to a convolution operation of the neural network based on the input feature map and the weight matrix, and wherein the arithmetic circuit comprises:
a first clock gating circuit configured to generate a second gated clock signal by selectively passing the clock signal based on values of the high-order bit data of the first operand;
a first flip-flop configured to latch the first latched high-order bit data of the first operand based on the second gated clock signal to output second latched high-order bit data of the first operand; and
a second flip-flop configured to latch the low-order bit data of the first operand based on the clock signal.

10. The arithmetic apparatus of claim 9, wherein the first operand holding circuit comprises a zero determination circuit configured to generate an indicator signal having a first logic level based on all bit values of the high-order bit data of the first operand being "0" and a second logic level based on at least one of the bit values of the high-order bit data not being "0," and wherein the first clock gating circuit generates the first gated clock signal by selectively passing the clock signal based on the indicator signal generated based on the bit values of the high-order bit data of the first operand.

11. The arithmetic apparatus of claim 9, wherein the first operand holding circuit comprises:
a third flip-flop configured to latch the high-order bit data of the first operand based on a second gated clock signal; and
a fourth flip-flop configured to latch the low-order bit data of the first operand based on the clock signal.

12. The arithmetic apparatus of claim 11, wherein the first operand holding circuit comprises a second clock gating circuit configured to generate the second gated clock signal by gating the clock signal input to the first operand holding circuit based on a logic level of an indicator signal generated based on the values of the high-order bit data of the first operand, and
wherein the third flip-flop is further configured to latch the high-order bit data of the first operand based on the second gated clock signal.

13. The arithmetic apparatus of claim 9, wherein the arithmetic circuit further comprises a data gating circuit configured to selectively pass the high-order bit data of the first operand based on a logic level of an indicator signal generated based on the values of the high-order bit data of the first operand, and
wherein the arithmetic circuit is further configured to perform the operation using the low-order bit data of the first operand and the second operand based on a first logic level of the indicator signal.

14. The arithmetic apparatus of claim 9, wherein the arithmetic circuit is further configured to output the operation result by performing convolution using a first operand set and a second operand set, the first operand set being provided from the first operand holding circuit and the second operand set being provided from the second operand holding circuit,
wherein the arithmetic circuit further comprises:
a multiplication circuit configured to generate a multiplication result by performing multiplication using the modified first operand and the second operand, and
an accumulation circuit configured to output the operation result by accumulating the multiplication result and summing a plurality of accumulated multiplication results.

15. The arithmetic apparatus of claim 14, wherein the multiplication circuit comprises a multiplier configured to multiply the modified first operand by the second operand, the modified first operand comprising latched high-order bit data of the first operand output from the first flip-flop and latched low-order bit data of the first operand output from the second flip-flop.

16. A neural network processor for accelerating a neural network to perform real time analysis of input data under a power consumption constraint, the neural network processor comprising:
an input feature holding circuit configured to:
output an input feature value based on a clock signal,
generate an indicator signal based on input feature high-order bit data corresponding to high-order bit values of a predetermined number of bits in the input feature value, wherein the input feature value is included in an input feature map of the neural network and
gate the clock signal applied to a first flip-flop configured to latch the input feature high-order bit data and output first latched input feature high-order bit data according to a logic level of the indicator signal;

a weight holding circuit configured to maintain and output a weight value according to the clock signal, regardless of bit values of high-order bit data of the weight value including the most significant bit of the weight value, wherein the weight value is included in a weight matrix of the neural network; and an arithmetic circuit configured to generate a gated clock signal by gating the clock signal according to the logic level of the indication signal, receive the first latched input feature high-order bit data from the input feature holding circuit, latch the first latched input feature high-order bit data according to the gated clock signal to generate second latched input feature high-order bit data according to the logic level of the indication signal, perform data gating on the second latched input feature high-order bit data according to the logic level of the indicator signal and output an operation result by performing multiplication and accumulation using a modified input feature value resulting from the data gating and the weight value, wherein the operation result corresponds to a convolution operation of the neural network based on the input feature map and the weight matrix.

17. The neural network processor of claim 16, wherein the input feature holding circuit comprises:

a first clock gating circuit configured to generate a first gated clock signal by selectively passing the clock signal based on the logic level of the indicator signal;

the first flip-flop configured to latch the input feature high-order bit data based on the first gated clock signal; and a second flip-flop configured to latch input feature low-order bit data based on the clock signal.

18. The neural network processor of claim 16, wherein the arithmetic circuit comprises a data gating circuit configured to perform the data gating by performing a logical AND operation using the indicator signal and the input feature high-order bit data, and wherein the modified input feature value includes a result value of the logical AND operation and an input feature low-order bit data.

* * * * *